United States Patent [19]

Hahle

[11] 4,157,227
[45] Jun. 5, 1979

[54] RESILIENT MOUNTING BUSHING

[75] Inventor: Hermann Hahle, Damme, Fed. Rep. of Germany

[73] Assignee: Lemförder Metallwaren AG, Lemförde, Fed. Rep. of Germany

[21] Appl. No.: 871,259

[22] Filed: Jan. 23, 1978

[30] Foreign Application Priority Data

Jun. 14, 1977 [DE] Fed. Rep. of Germany ....... 2726676

[51] Int. Cl.² ........................... F16D 1/00; F16J 1/38; F16B 1/00
[52] U.S. Cl. .................................. 403/228; 267/141.2
[58] Field of Search ............... 403/202, 203, 225, 221, 403/228, 219; 248/358 R, 374, 7, 9, 10, 26, 15

[56] References Cited

U.S. PATENT DOCUMENTS

| | | | |
|---|---|---|---|
| 2,214,942 | 9/1940 | Taub | 248/7 |
| 2,958,526 | 11/1960 | Ulderup et al. | 248/7 X |
| 3,055,687 | 9/1962 | Hutton | 403/221 |
| 3,288,404 | 11/1966 | Schmidt et al. | 248/9 X |

*Primary Examiner*—Wayne L. Shedd
*Attorney, Agent, or Firm*—McGlew and Tuttle

[57] ABSTRACT

A resilient mounting bushing, particularly for spring mounting drive and other units of motor vehicles, comprises an inner and an outer cylindrical bushing disposed one within the other and an elastomer spring body interconnected between the bushings, which has upper and lower spaced apart diametrically opposed axial through recesses, one of the recesses being closed slightly by loading of one of the bushings and an insert of hard material disposed in the other one of the recesses acting in a direction to open the recess.

6 Claims, 3 Drawing Figures

RESILIENT MOUNTING BUSHING

BACKGROUND OF THE INVENTION

1. Field of the Invention

The invention relates in general to the construction of spring bushings and in particular to a new and useful spring element for the spring suspension of drive or other units in motor vehicles, which comprises two cylindrical bushings disposed one within the other and an elastomer spring body having axial through recesses, which is adhesively embedded between the bushings.

2. Description of the Prior Art

Spring busings are particularly well suited to spring mount or suspend engines or other units from the vehicle superstructure, thereby damping the vibrations and noises stemming from the unavoidable relative motions between these parts. Under loads, the recesses in the elastic spring body permit a displacement of the elastic material, thereby achieving, depending on the design of these cavities, different spring characteristics in radial directions and different behavior with respect to the vibrations occurring. But these design measures are insufficient to achieve a particularly great spring bushing stiffness in the one or the other radial direction.

SUMMARY OF THE INVENTION

An object of the invention is to perfect spring elements so as to achieve a very great stiffness in one radial direction and a relatively great softness of the spring element in the opposite direction. At the same time, the relationship between the compressive and tensile loads acting upon the spring element is influencable in an advantageous manner.

The invention solves this problem in that an insert consisting of a hard material, preferably sheet steel, is inserted in one of two diametrically opposed recesses.

In a special embodiment of the invention, one side of the insert is firmly bonded to the one or other wall of the recess whereas the opposite surface of the insert, in the no load condition of the spring element, is in freely movable contact or almost in contact with the wall of this recess adjacent thereto.

According to the invention it is further advantageous to provide between the unconnected surface of insert and recess wall a lubricant such as a plastic slide layer.

According to another feature of the invention, the sheet metal insert extends essentially over the length of the axial through recess and hugs its contour in cross-section.

It is expedient for the recesses to be kidney-shaped in known manner.

What the invention achieves first of all is that the spring element is given varying elasticity in radial direction according to the acting load direction. This uneven elastic resistivity prevents or mitigates the development of vibrations propagating in disturbing manner into the vehicle upper structure. The annoying noises caused by forces and shocks from the road can also be damped. In addition, there result other considerable advantages due to the inventive design of a spring element. One advantage is that a particularly great stiffness in the desired radial direction can be achieved by the interposition of a hard insert in one of the recesses while a greater softness is provided in the opposite direction for the achievement of an effective attenuation of the vibrations occurring. Also, the harmful tensile stresses otherwise occurring on the pressure relieved side in the spring body and leading to the premature destruction of the elastic material are avoided in simple manner by the design according to the invention.

Accordingly it is an object of the invention to provide an improved resilient bushing which includes inner and outer cylindrical metal bushings portions disposed one within the other and an elastomer spring body interconnected between the two bushings, which as upper and lower spaced arcuate axial through recesses, one of the recesses being oriented so that it becomes closed by the loading of one of the bushings due to the stretching of the spring body and the other being constructed with an insert of hard material such as metal which when loaded acts to open the recess.

A further object of the invention is to provide a resilient mounting bushing which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

GENERAL DESCRIPTION OF THE PREFERRED EMBODIMENTS

Figure 1:
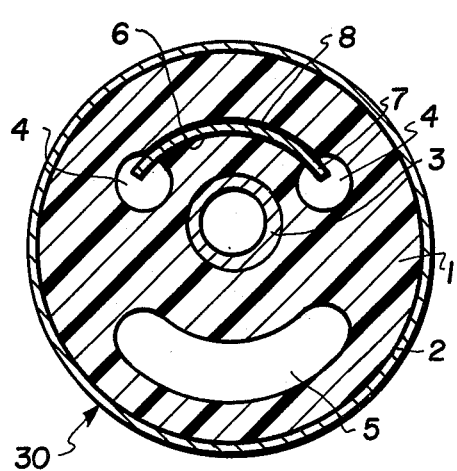
FIG. 1 is a transverse sectional view of a resilient bushing assembly constructed in accordance with the invention.

Referring to the drawings in particular, the invention embodied therein as shown in FIG. 1 in an unloaded state comprises an elastic bushing assembly or spring element generally designated 30, which comprises an inner metal bushing 3 and an outer metal bushing 2 with the inner metal bushing 3 being arranged within the outer metal bushing 2. The spring element 30 comprises a spring body 1 of elastic material such as rubber, plastic, or the like. This body is assembled, expediently preloaded, between two rigid bushings, an outer metal bushing 2 and an inner metal bushing 3. Bushing 3 also serves as a seat for a pin for connection (not shown) to the frame or body of a motor vehicle. Provided in the spring body 1 are two recesses 4 and 5, opposing each other in radial directions. The bushings are firmly bonded to the material of the spring body 1 such as by vulcanizing so that twisting of the bushings relative to each other about the longitudinal axis of the spring body within the molecular deformation limits of the elastic material is also possible.

As may be seen from FIG. 1, the recesses, acting as displacement spaces, differ from each other in their shape as long as the spring body is under no load, i.e., unassembled. Whereas the recess 5 penetrates the spring body 1 lengthwise in kidney shape, the recess 4 consists at first of two roughly circular spaces only connected to each other by a slot 6 likewise penetrating the spring body lengthwise. Inserted in this arch-shaped slot is a correspondingly arched piece of steel sheet 7 as a stiffening element whose radially external surface 8 is firmly bonded to the adjacent surface of the spring body 3. There is no bond whatever between the inwardly oriented surface of the steel sheet 7 and the adjacent area of the elastic material. The material is merely in contact with the sheet metal surface with no spacing therebetween. Both surfaces can move freely relative to each other in both radial and axial planes. Between these two surfaces may be provided a slide layer (not shown) which may be produced, for instance by spraying on a suitable plastic.

Figure 2:
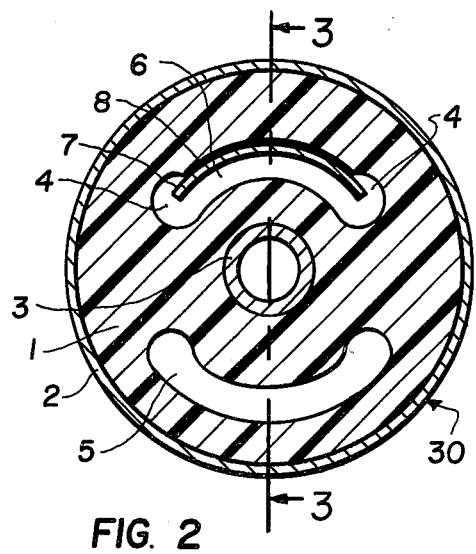
FIG. 2 is a view of the bushing assembly shown in FIG. 1 under a loaded condition.
Figure 3:
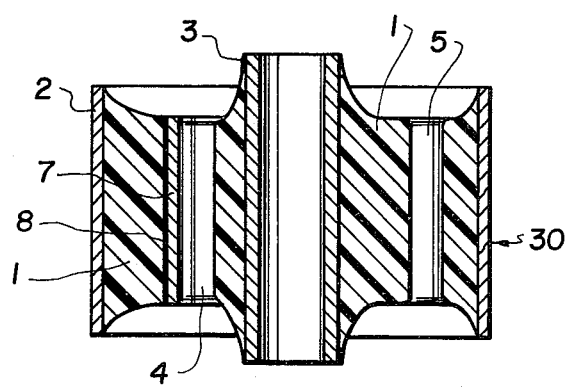
FIG. 3 is a section taken along the line 3—3 of FIG. 2.

In FIGS. 2 and 3 the spring element is shown in assembled, statically loaded condition. The elastic material is displaced under the load in vertical direction, in which process the slot 6 between the steel sheet 7 and the inside wall of recess 4 widens so that the slot becomes bigger, roughly corresponding to the recess 5 which has become smaller under the compressive load. The inner bushing 3 then assumes a concentric position relative to the outer bushing 2. Due to the insertion of the piece of steel sheet 7 and its specific arrangement, namely bonded to the spring body 1 on one side only, a very high stiffness in the one radial direction and great softness in the opposite direction are achieved in the spring action and harmful tensile stresses are avoided to the greatest possible extent.

While a specific embodiment of the invention has been shown and described in detail to illustrate the application of the principles of the invention, it will be understood that the invention may be embodied otherwise without departing from such principles.

What is claimed is:

1. A resilient bushing assembly, particularly for a spring mounting drive in an automobile, comprising an inner and an outer cylindrical bushing, said inner bushing being disposed within said outer bushing, an elastomer spring body interconnected between said inner and outer bushings having upper and lower spaced apart diametrically opposed axial through recesses therethrough, one of said recesses being closed slightly by loading of said bushings, and an insert of hard material inserted into only the said one of said recesses said insert acting in a direction to open the recess under load.

2. A resilient bushing assembly according to claim 1, wherein said insert is unilaterally bonded on its one side to the adjacent wall of said spring body and has an opposite surface which is freely movable in respect to the spring body in the unstressed condition of the resilient bushing assembly.

3. A bushing assembly according to claim 2 including a lubricant in the recess between said spring body and said insert.

4. A bushing assembly according to claim 1 wherein said recesses are curved and said inserts are correspondingly curved and extend over substantially the whole circumferential length of the recesses.

5. A bushing assembly according to claim 1 wherein said recesses are arcuate and of generally kidney-shaped configuration.

6. A bushing assembly according to claim 1 where, in the unstressed condition said upper recess is substantially closed, said insert comprising a steel sheet having its outer side bonded to said spring body and its inner side slidable in respect to said spring body.

* * * * *